March 24, 1936.  W. A. EATON  2,035,305
BRAKE MECHANISM
Filed May 3, 1932  4 Sheets-Sheet 1
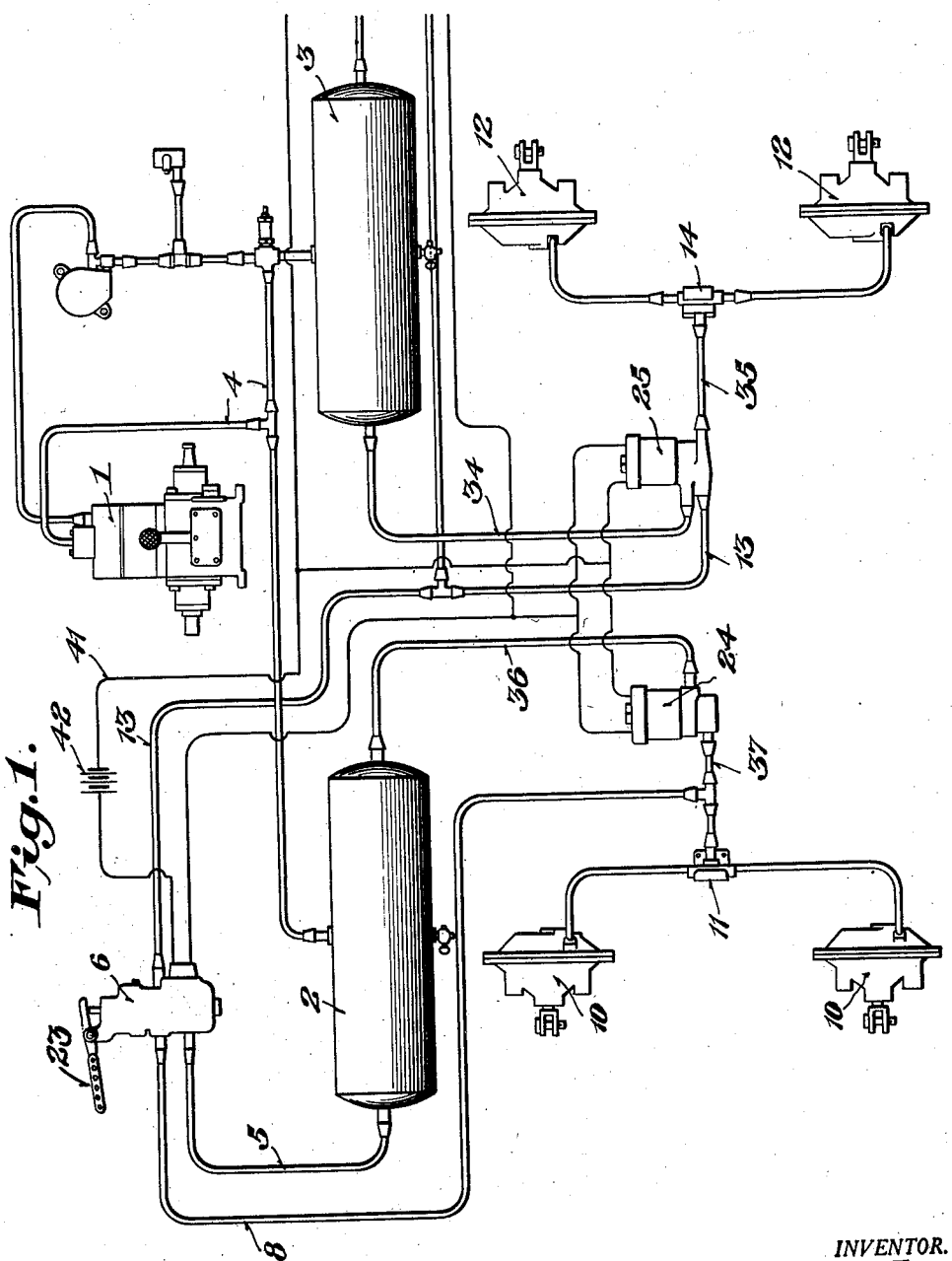
INVENTOR.
WILFRED A. EATON,
BY
ATTORNEY March 24, 1936. W. A. EATON 2,035,305
BRAKE MECHANISM
Filed May 3, 1932 4 Sheets-Sheet 2
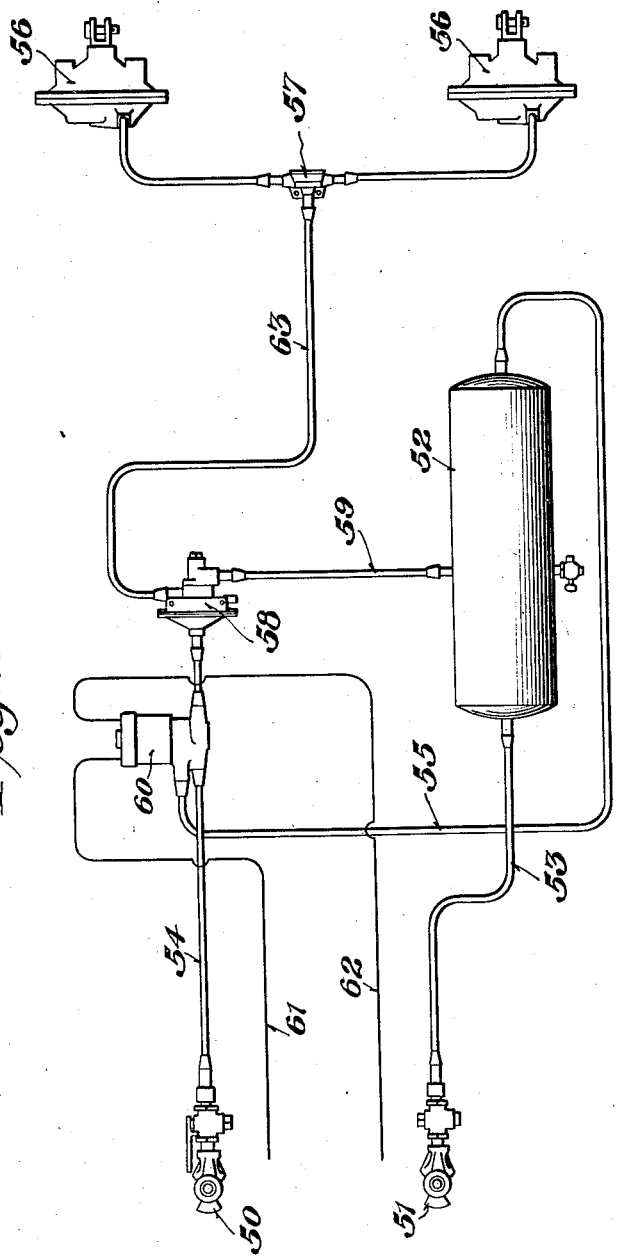
INVENTOR.
WILFRED A. EATON,
BY
ATTORNEY

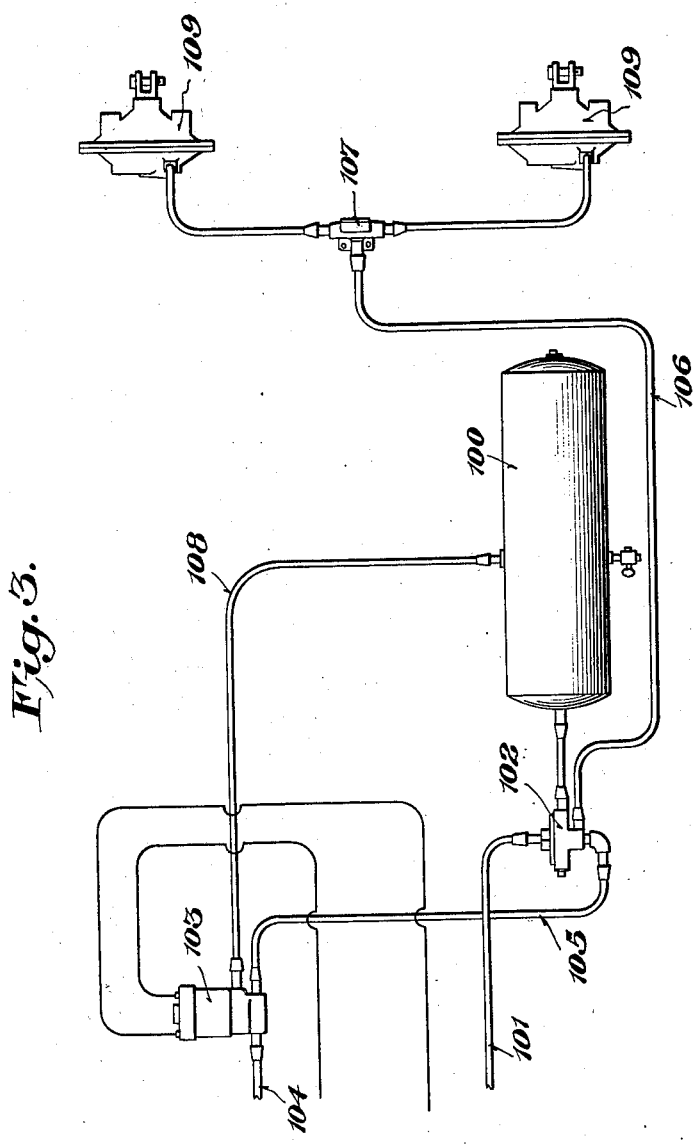

March 24, 1936.  W. A. EATON  2,035,305
BRAKE MECHANISM
Filed May 3, 1932  4 Sheets-Sheet 4
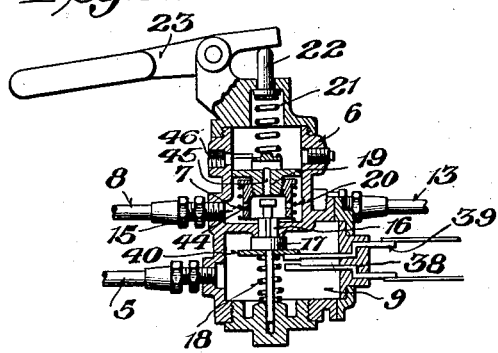
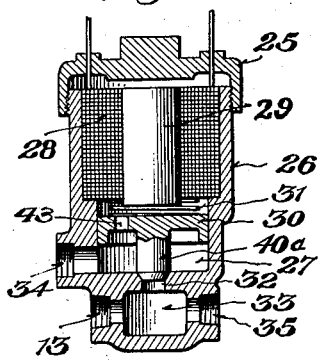
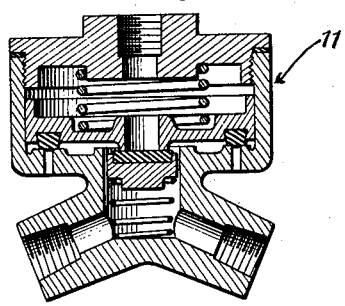
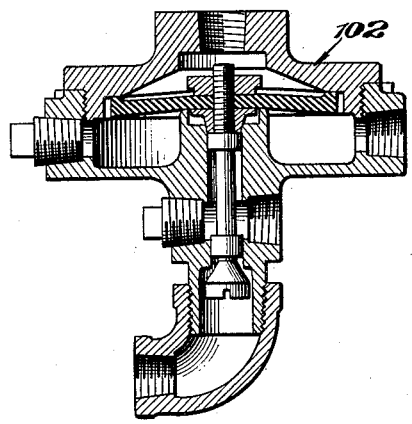
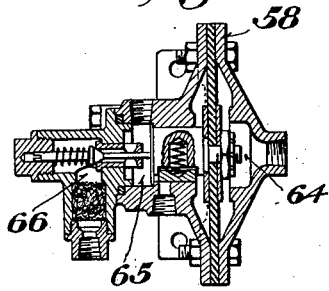
INVENTOR.
WILFRED A. EATON,
BY
ATTORNEY Patented Mar. 24, 1936

2,035,305

UNITED STATES PATENT OFFICE 2,035,305

BRAKE MECHANISM

Wilfred A. Eaton, Pittsburgh, Pa., assignor to Bendix Westinghouse Automotive Air Brake Company, Pittsburgh, Pa., a corporation of Delaware Application May 3, 1932, Serial No. 609,017

9 Claims. (Cl. 303—15)

This invention relates to brakes and more particularly to compressed air systems for the braking of vehicles of either the tractor or trailer type.

In the usual compressed-air braking systems, as heretofore employed, a delay in the operation of the brakes, after the operation of the brake valve, has been almost unavoidable due to the necessity of placing the brake valve at a point remote from the brake cylinders, and due to the design of such systems, in which fluid under pressure in the reservoir is always relayed to the brake cylinders through the brake valve, the operation of which is necessary to cause any actuation of the brake pistons. It has been found that in truck and trailer vehicle trains or in vehicles of extraordinary length the delay in operation of the brakes after operation of the brake valve is sometimes greater than the requirements of proper brake operation permit, causing at times, buckling of tractor-trailer vehicles or placing excessive stress on the parts of a long vehicle.

It is therefore an object of the present invention to provide a braking system for vehicles in which the delay in the operation of the brakes after the actuation of the brake valve is reduced to a minimum.

Another object of the present invention is to provide in an air brake system, a quicker brake application than is possible with methods now in use.

Another object is to provide novel means for causing rapid operation of compressed air brakes, which novel means shall not conflict in any way with the operation of the usual means for operating the brakes, whereby normal operation is assured in the event of failure of the device according to this invention.

A further object is to provide a compressed-air braking system including electrically-operated means for causing a more rapid operation of the brakes.

A further object is to provide means, associated with a compressed-air braking system of the usual type, for effecting more rapid actuation of the brakes, these associated means being actuated upon operation of the brake valve of the usual compressed-air system.

A still further object is to provide means for initiating rapid operation of compressed-air brakes, which means may be associated with a compressed-air braking system of usual design without material change to said system and with the addition of a minimum number of parts.

Other objects and features of novelty of the invention will appear more clearly from the following detailed description taken in connection with the accompanying drawings, which illustrate one embodiment of the invention. It is to be expressly understood, however, that the drawings are for purposes of illustration only and are not designed as a definition of the limits of the invention, reference being had for this purpose to the appended claims.

Referring to the drawings:

Fig. 1 is a plan view showing a compressed-air brake system of usual design and also embodying the present invention;

Fig. 2 is a plan view showing a trailer brake layout of usual design and showing the adaptation of the present invention to such trailer brake systems;

Fig. 3 is a plan view of a slightly different system of compressed-air braking for trailer vehicles showing the adaptation of the present invention to such a system;

Fig. 4 is a sectional view of a brake valve of usual construction for compressed-air systems, the same having parts added thereto, such parts forming part of the present invention;

Fig. 5 is a sectional view of an electrically-operated valve forming part of the present invention and shown in operative relation to other parts in other figures of the drawings;

Fig. 6 is a sectional view of a quick release valve which is also shown in its operative relation to other parts in other figures of the drawings;

Fig. 7 is a sectional view of an emergency valve, the same being shown in its operative relation to other parts in other figures of the drawings; and Fig. 8 is a sectional view of a quick application and release valve, the same being shown in its operative relation to other parts in other figures of the drawings.

Referring to the drawings and particularly to Fig. 1 thereof, it will be observed that the system shown therein comprises a straight air-brake system of well-known construction, the same including, as is usual in such systems, a compressor 1 supplying fluid under pressure to reservoir tanks 2 and 3 through piping 4. Reservoir 2 is connected through pipe 5 to chamber 9 of a brake valve 6 of usual construction, the same being more fully disclosed in Fig. 4. Chamber 7 of brake valve 6 is connected through pipe 8 to brake cylinders 10 through quick release valve 11, the same being of well-known construction and more fully disclosed in Fig. 6 of the drawings. Brake valve 6 is also connected to brake cylinders 12 through piping 13 and quick release valve 14, similar to valve 11 illustrated in Fig. 6.

Means are provided for causing operation of the above-described system to effect application of the brakes, such means including the brake valve 6 disclosed in Figs. 1 and 4. Referring particularly to Fig. 4, it will be observed that the brake valve 6 comprises a casing divided into upper chamber 15 and lower chamber 9. These chambers are connected by a port 16 which is normally closed by a valve member 17 which is disposed in chamber 9 and urged into port closing position by a spring 18. Valve member 17 is provided with a stem which extends upwardly into chamber 15 and which may be engaged by a piston 19 during downward movement thereof, the latter being however, normally held out of engagement with valve 17 by means of a spring 20. A spring 21 is disposed between piston 19 and a member 22 slidably disposed in the upper part of the brake valve casing and which is adapted to be acted upon by a member 23. As described above, reservoir 2 is connected with chamber 9 through pipe 5, such connection being normally open. Pipes 8 and 13, referred to hereinbefore, open into chamber 7 and are normally open to the atmosphere through chamber 7, ports 44 and 45 in piston member 19, and exhaust port 46 in the brake valve casing. Communication between chamber 7 and chamber 9 is normally closed due to the closure of port 16 by valve 17, the same being urged to closed position by spring 18. It will be apparent that if member 23 is operated to depress the slidable member 22, piston 19 will be moved downwardly to engage the stem of valve 17, thereby opening the same, whereupon compressed air from reservoir 2 will flow to the brake cylinders 10 and 12 through pipe 5, chamber 9, port 16, chamber 7 and pipes 8 and 13, past quick release valves 11 and 14.

Means are provided by the present invention for causing brake cylinder pressure to be built up to any desired value in a shorter time than is required for the building up of an equal brake cylinder pressure by the above-described system. As shown, such means comprise electro-magnetic valve devices 24 and 25, the latter of which is more fully illustrated in Fig. 5 of the drawings. The valve 25 comprises a two-part casing, the lower part 26 of which includes a chamber 27 having disposed in the upper part thereof a magnet device comprising the coils 28 and the armature 29. A guide member 30 is disposed below said armature member and is normally held from engagement therewith by means of a spring 31. Guide 30 is formed with an extension 40a, the lower part of which forms a valve which normally closes a port 32 which connects the chamber 27 to a lower chamber 33. Chamber 27 is connected at all times to reservoir 3 through a pipe 34 and lower chamber 33 is connected at all times with the chamber 15 of the brake valve 6 through pipe 13. Chamber 33 is also connected with the brake cylinder 12 through pipe 35. It will be seen that normally the reservoir 3 is not connected to either the brake valve through pipe 13 or with the brake cylinders 12 through pipe 35, due to the fact that valve 40 is normally closed by a spring 31. A port 43 is provided in the guide member 30 for equalizing the pressures on opposite sides thereof.

Magnet valve 24 is of substantially the same construction as magnet valve 25 with the exception that magnet valve 24 is not connected directly to the brake valve 6. In magnet valve 24 the upper chamber is connected at all times to reservoir 2 through pipe 36 and the lower chamber thereof is connected at all times to the brake cylinder 10 through pipe 37 and the quick release valve 11. Pipe 37 is constantly connected to chamber 15 of brake valve 6 through pipe 8. It will be observed that on energization of the magnet windings of magnet valve 25, the piston 30 will be raised against the force of spring 31 thereby establishing communication between lower chamber 33 and upper chamber 27. Immediately on such communication being established fluid under pressure from reservoir 3 will flow to brake cylinders 12 through pipe 34, chamber 27, port 32, chamber 33, pipe 35 and past quick release valve 14. When the coils of magnet valve 24 are energized, the operation will be exactly the same. In this case, fluid under pressure from reservoir 2 will flow to brake cylinders 10 through pipe 36, the upper chamber of magnet valve 24, past the opened valve in magnet valve 24, the lower chamber, pipe 37 and past quick release valve 11.

Means are provided for energizing the magnet valves 24 and 25, such means comprising switch members 38 and 39 disposed in the wall of brake valve 6 and having flexible portions extending into chamber 9 of said valve. As shown the valve 17 is provided with means such as a plate 40 which, when said valve 17 is depressed, is adapted to engage switch member 39 and move the same into engagement with switch member 38 thereby closing an electrical circuit 41 and energizing magnet valves 24 and 25. A battery 42 may be included in said electrical circuit and such battery may be the ordinary ignition battery of the vehicle.

In operation the driver of the vehicle, when it is desired to apply the brakes, will manually operate lever 23 to thereby open port 16 in brake valve 6 by depressing valve 17. As described above, such operation will cause a wave of pressure to flow from reservoir 2 to the brake cylinders 10 and 12 through brake valve 6. However, immediately on depressing valve 17 the switch contacts 38 and 39 will be closed and magnet valves 24 and 25 will be energized. Such energization will cause armature 29 to attract piston 30 and raise the same thereby opening communication between reservoir 3 and brake cylinders 12 and building up an immediate pressure in such brake cylinders. It will be obvious that the valve 32 will be opened to its full extent instantaneously. It will be seen that air is admitted to the brake chambers from two sources at the same time, namely the brake valve 6 and the magnet valve 25, this resulting in a very rapid build up of pressure in the brake chambers. As the pressure in the brake chambers builds up to that for which the brake valve is set, this increase of pressure is transmitted back to brake valve chamber 7 through the pipes 13 and 8, thus forcing piston 19 upwardly against the force of spring 21 and gradually closing the valve 17. It should be noted that while the intake valve 17 gradually closes when the pressure in the brake cylinders reaches the desired point, the magnet valves remain wide open until the intake valve 17 is substantially closed, thus providing an unimpeded passage of air from the reservoirs to the brake chambers until the desired pressure is reached.

The present invention also contemplates the use of the magnet valves in conjunction with the compressed-air braking system of a trailer vehicle and the adaptation of the invention to such a system is disclosed in Fig. 2 of the drawings. In this figure the numeral 50 denotes a connection to the service line from the tractor vehicle, such service line being attached to the tractor brake valve, and supplying air at tractor reservoir pressure on actuation of the brake valve. Numeral 51 denotes a coupling to the air supply system on the tractor vehicle and trailer reservoir 52 is adapted to be supplied through said coupling and pipe 53. Coupling 50 is connected through pipe 54 to the lower chamber 33 of a magnet valve 60 of the same construction as that disclosed in Fig. 5. The upper chamber 27 of said magnet valve is constantly connected to reservoir 52 through pipe 55. Lower chamber 33 of the magnet valve device is also constantly connected to the chamber 64 of a quick application and release valve 58 such as is disclosed in Fig. 8. The construction and operation of such a valve are fully set forth in the U. S. patent to Lewis No. 1,438,317 and this valve per se forms no part of the present invention. Brake cylinders 56 are constantly connected through quick release valve 57 to the chamber 65 of the quick application and release valve 58 through pipe 63, see Fig. 8. Reservoir 52 is in constant communication with chamber 66 of valve device 58 through pipe connection 59. Magnet valve 60 is connected in parallel with the magnet valve or valves on the tractor vehicle by electrical leads 61, 62, such connection permitting operation of either the tractor or trailer vehicle magnet valves should those on the other vehicle, for any reason, fail to operate or break.

In the operation of the above-described structure, pressure in reservoir 52 will be maintained by the compressor on the tractor vehicle through pipe 53. On operation of the tractor brake valve, pressure from the tractor reservoir will flow through the tractor brake valve, coupling 50, pipe 54, chamber 33 in magnet valve 60, to chamber 64 of quick emergency and release valve 58, causing actuation of the same to allow pressure to flow from reservoir 52 to brake cylinders 56 through pipe 59, chamber 66 and chamber 65 of valve device 58, pipe 63, and quick release valve 57. It will be apparent that in this operation the building up of pressure in the brake cylinders will be relatively slow because of the somewhat complicated operation and the considerable length of pipe which must be traversed by the wave of pressure.

It will be recalled that when lever 23 of brake valve 6 is actuated to effect a brake application, contacts 38 and 39 will be closed, thereby energizing the tractor magnet valves. The trailer magnet valves, being connected in parallel with the tractor magnet valves, will therefore be energized and piston valve 30 of valve 60 will be opened by magnet 28, 29. Air under pressure from reservoir 52 will then pass through pipe 55, chamber 27 of the magnet valve, port 32, chamber 33 of the magnet valve and into chamber 64 of quick application and release valve 58, operating said valve to allow air under pressure from reservoir 52 to pass to the brake cylinders 56 through pipe 59, chambers 66 and 65 of the quick application and release valve pipe 63, and past quick release valve 57. It will be apparent from the above that by the use of the magnet valve, compressed air will pass from reservoir 52 to the valve 58 to operate the latter, in a small fraction of the time required for air to pass from the tractor reservoir through the tractor brake valve 6 to the valve 58. Thus an exceedingly rapid build-up of pressure will occur in the brake cylinders immediately following actuation of the brake valve. As the pressure in the pipe 54 builds up to that for which the tractor brake valve is set, the valve 17 of the brake valve will gradually close, as fully described hereinbefore, thereby restricting the air flow from the brake valve 6. No such action takes place in the magnet valve, however, and the reservoir 52 will be in open communication with the brake cylinders 56 until valve 17 of the brake valve 6 is substantially closed, thereby allowing switch contacts 38, 39 to open and break the circuit including the magnet valves and allowing spring 31 of valve 60 to force piston valve 30 downwardly to close port 32, the brakes then being released, as desired, through brake valve 6 on the tractor.

The invention also contemplates the use of a magnet valve in connection with a trailer brake system which does not include a quick application and release valve, such a system, including the magnet valve, being illustrated in Fig. 3 of the drawings. In this drawing pressure in the trailer reservoir 100 is maintained through pipe 101 by the compressor mounted on the tractor vehicle. An emergency valve 102 is provided, such valve being shown in detail in Fig. 7 of the drawings. Such valve forms no part of the present invention and it may be considered for the present purposes that pipe 101 is continuous to reservoir 100. A magnet valve 103 of the form disclosed in Fig. 5 is provided, the magnet coils of the same being connected in parallel with the magnet valve carried by the tractor. Lower chamber 33 of magnet valve 103 is constantly connected, through one opening therein, to the chamber 15 of the tractor brake valve 6 through pipe 104, and is permanently connected, through a second opening, to the brake cylinders 109 through pipes 105 and 106, such pipes 105 and 106 connecting through the emergency valve 102, which offers a continuously open communication between these two pipes and forms no part of the present invention. A quick release valve 107 is interposed between the pipe 106 and brake cylinders 109. The chamber 27 of the magnet valve device is constantly connected with reservoir 100 through pipe 108.

In operation, when the tractor brake valve 6 is operated to effect brake application, fluid pressure will be transmitted from the tractor reservoir through brake valve 6 on the tractor vehicle, pipe 104, chamber 33 of magnet valve 103, pipe 105, emergency valve 102, pipe 106, and quick release valve 107 to brake cylinder 109. At the same time that brake valve 6 is operated as above described, to effect operation of the pneumatic system, contacts 38 and 39 will be closed, thereby energizing the coils of magnet valve device 103 and establishing communication between trailer reservoir 100 and the brake cylinders 109 through pipe 108, chamber 27 of magnet valve device 103, port 32, chamber 33, pipe 105, emergency valve 102, pipe 106 and quick release valve 107, thereby giving a practically instantaneous application of the brakes. It will be obvious that, as in the other systems described, as the brake cylinder pressure builds up to that for which the brake valve 6 is set, the valve 17 of such brake valve will slowly close, thereby gradually cutting off the supply of air from the tractor reservoir and brake valve to the trailer brakes. No such action will take place in magnet valve 103, however, and communication between reservoir 100 and brake cylinders 109 will be maintained open until valve 17 of valve device 6 is nearly closed, thereby opening contacts 38 and 39 and deenergizing the coils of magnet valve 103.

While there have been shown and described various systems embodying the present invention, it is to be understood that the invention is not in any way limited thereby, and that different designs and modifications of the structures illustrated and described may be employed without departing from the spirit of the invention, reference being had for this purpose to the appended claims.

What is claimed is:

1. A fluid-pressure braking system comprising a reservoir, brake cylinders, a self-lapping valve device actuatable to establish communication between said reservoir and said brake cylinders through said valve device, and electrically-operated means controlled by said self-lapping valve device for establishing communication between said reservoir and said brake cylinders through said means.

2. In a fluid-pressure braking system, a reservoir, brake cylinders, a brake valve, an electrically-operated device for establishing communication between said brake cylinders and said reservoir, said device comprising a chamber connected to said brake cylinders and to said brake valve, a chamber connected to said reservoir, and means controlled by said brake valve for establishing communication between said chambers.

3. In a fluid-pressure braking system, a reservoir, brake cylinders, a self-lapping brake valve, a magnet valve device, means controlled by the self-lapping brake valve for establishing communication between said reservoir and brake cylinders through said brake valve, and other means controlled by said brake valve for energizing said magnet valve device to directly connect said reservoir and said brake cylinders through said magnet valve device.

4. In a fluid-pressure braking system having a source of fluid under pressure, brake cylinders, a self-lapping brake valve for establishing communication between said source and said cylinders, and a second valve operable upon initial opening of said brake valve for effecting unimpeded communication between said source and said cylinders and operable when said brake valve approaches closed position to completely interrupt communication between said source and said cylinders through said second valve.

5. In a fluid-pressure braking system the combination of braking cylinders, a reservoir, a manually-operable valve device, an electrically-operable valve device, passages leading from said manually-operable valve device to said brake cylinders for supplying fluid under pressure to said brake cylinders, said passages also supplying fluid under pressure to said manually-operable device to deenergize said electrically-operable valve device.

6. In a fluid-pressure braking system the combination of braking cylinders, a reservoir, a manually-operable valve device, an electrically-operable valve device, means connecting said brake cylinders and said manually-operable valve device for supplying fluid under pressure to said brake cylinders through said device, means operable by said manually-operable valve device for energizing said electrically-operable valve device for supplying fluid under pressure to said brake cylinder, and means operable by the fluid under pressure in said connecting means for deenergizing said electrically-operable valve device.

7. In a fluid-pressure braking system the combination of braking cylinders, a reservoir, manually-operable means for connecting said braking cylinders and said reservoir, electrically-operable means for connecting said brake cylinders to said reservoir, and means included in said manually-operable means and operable by fluid pressure in said braking cylinders for deenergizing said electrically-operable means.

8. In a fluid pressure braking system having a source of fluid under pressure, brake chambers, means including an electrically-operated valve for controlling the flow of fluid from said source to said chambers, manually-controlled means operable to energize said valve to open position, and means included in said manually-controlled means and operable by the pressure of the fluid supplied said brake chambers for deenergizing said electrically-operable valve.

9. In a tractor and trailer fluid pressure braking system including sources of fluid under pressure and brake chambers carried by said tractor and trailer respectively, manually-operable means for connecting said tractor-carried source and brake chambers, electrically-operable means for connecting said trailer-carried source and brake chambers, and means included in said manually-operable means and operable by fluid pressure in said brake chambers for deenergizing said electrically-operable means.

WILFRED A. EATON.